(12) United States Patent
Allender et al.

(10) Patent No.: US 6,340,995 B1
(45) Date of Patent: Jan. 22, 2002

(54) EMISSION CONTROL WITH SCANNING BEAM VELOCITY MODULATION

(75) Inventors: Jeffrey Owen Allender, Morristown; Dal Frank Griepentrog, Indianapolis, both of IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/434,530

(22) Filed: Nov. 5, 1999

(51) Int. Cl.⁷ .................................................. H04N 5/21
(52) U.S. Cl. ...................................................... 348/626
(58) Field of Search .................................. 348/626, 625, 348/630; 315/387, 389, 397, 403; H04N 5/21, 5/208, 5/68

(56) References Cited

U.S. PATENT DOCUMENTS 6,239,561 B1 * 5/2001 Allender ...................... 348/626

* cited by examiner

Primary Examiner—Sherrie Hsia
(74) Attorney, Agent, or Firm—Joseph S. Tripoli; Harvey D. Fried; Francis A. Davenport

(57) ABSTRACT

Generation of unintentional emissions are controlled by analysis of display signal content processed for scanning beam velocity modulation. An apparatus for scanning beam velocity modulation comprises a scanning velocity modulation signal processor for generating an scanning velocity modulation deflection signal responsive to a scanning velocity modulation signal. A generator supplies a feed forward signal to the processor for controlling the scanning velocity modulation deflection signal amplitude in response to a component of the scanning velocity modulation signal.

16 Claims, 5 Drawing Sheets

EMISSION CONTROL WITH SCANNING BEAM VELOCITY MODULATION

This invention relates generally to scanning beam velocity modulation (SVM), and more particularly to a circuit arrangement employed therein to control generation of unwanted emissions.

BACKGROUND OF THE INVENTION

The apparent sharpness of a cathode ray tube picture may be enhanced by modulation of the scanning beam velocity in accordance with a derivative of the display picture video signal. The derivative signal, or SVM signal, may be derived from a luminance component of the video display signal and is employed to produce scanning beam velocity variations. Slowing the scanning velocity of the electron beam results in a localized brightening of the displayed image, whereas acceleration of the scanning velocity results in a localized darkening of the display. Thus, edges of the displayed image may be perceived to have a more rapid transition or faster rise time by varying the intensity of the display about the edge. This method of sharpness enhancement provides various advantages over that provided by video frequency response peaking, for example, blooming of peaked high luminance picture elements is avoided, and in addition, unwanted video noise occurring within the bandwidth of the video peaking arrangement is not enhanced.

The velocity of the scanning beam may be modulated by an SVM coil, positioned on the CRT neck to generate a supplementary or SVM deflection field. The SVM field, in conjunction with the main deflection field, produces electron beam acceleration or deceleration responsive to the polarity of current in the SVM coil. Thus the amount of beam acceleration or deceleration is proportional to the magnitude of the SVM current, which in turn is proportional to the amplitude of image components within the display signal.

Deficiencies in SVM signal processing may generate unwanted products or harmonics which are readily radiated or conducted both within and beyond the display device. However, although careful attention to circuit design and layout may significantly reduce the generation of unwanted SVM products, the actual display signal content may result in of unwanted SVM products, the actual display signal content may result in SVM signals of sufficient magnitude and spectral composition to result in unintentional emissions beyond the display device.

SUMMARY OF THE INVENTION

Unintentional emissions are prevented by an inventive arrangement for analysis of display signal content and generation of an amplitude control signal. An apparatus for scanning beam velocity modulation comprises a scanning velocity modulation signal processor for generating an scanning velocity modulation deflection signal responsive to a scanning velocity modulation signal. A generating means supplies a feed forward signal to the processor for controlling the scanning velocity modulation deflection signal amplitude in response to a component of the scanning velocity modulation signal.

DETAILED DESCRIPTION

Figure 1:
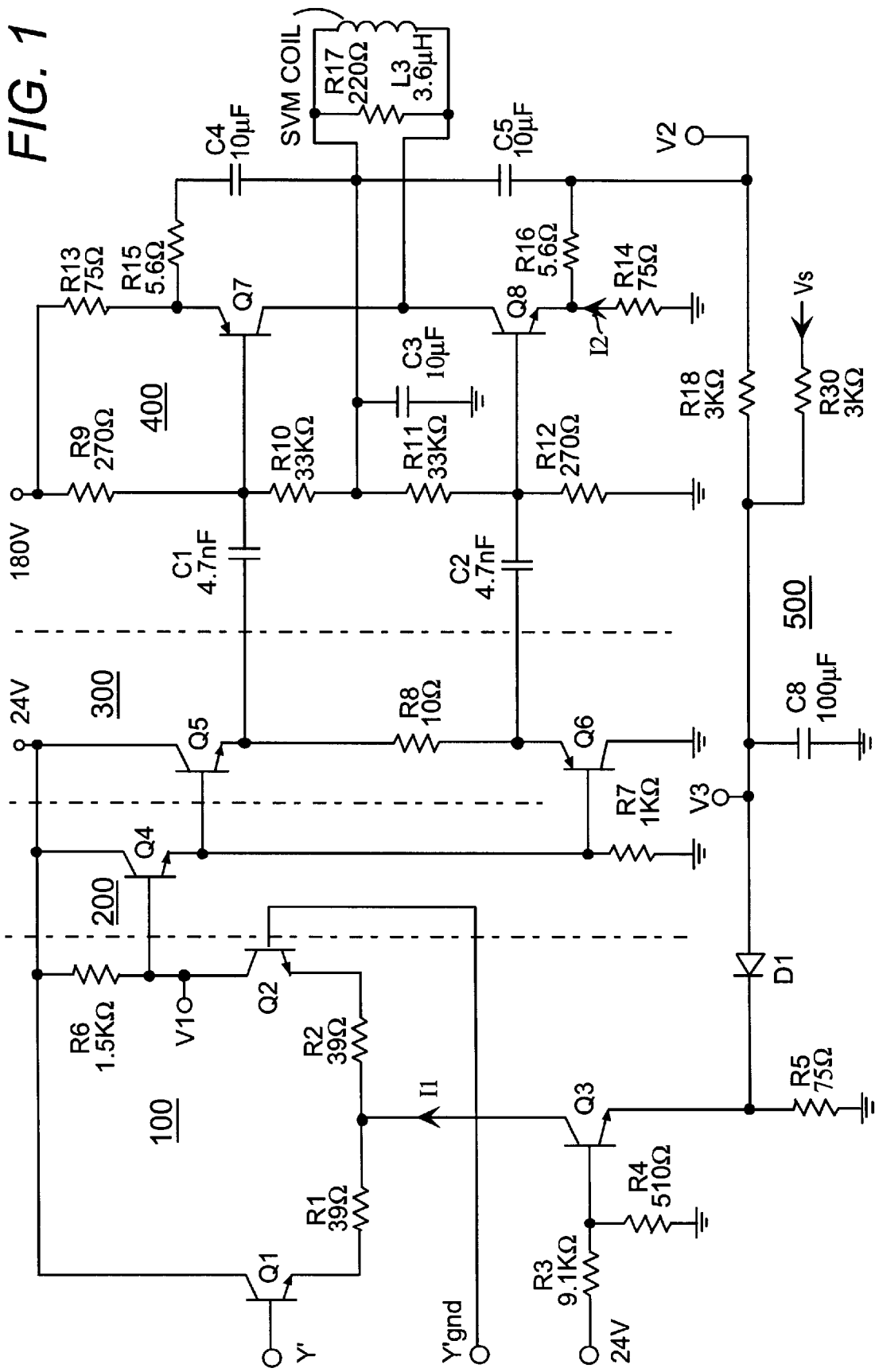
FIG. 1 illustrates an exemplary SVM drive amplifier with output power control and velocity modulation coil.

FIG. 1 illustrates a scanning beam velocity modulation signal processor and SVM coil drive amplifier. An SVM input signal, Y' and Y' gnd, is coupled to a differential amplifier 100, and may be generated by well known methods, for example by differentiation of the display signal luminance component. Amplifier 100 provides amplification of the SVM input signal and also provides control of output signal V1 amplitude. Buffer amplifier 200 receives output signal V1 and provides separation between the gain determining function of amplifier 100, and driver amplifier 300 which drives power amplifier 400 and SVM coil L3. Current I2 flowing in power amplifier 400 develops a voltage V2 which is coupled to low pass filter 500 to form a control voltage V3. Voltage V3 is fed back to control current I1 in differential amplifier 100. Thus, as current I2 in power amplifier 400 increases, voltages V2 and V3 also increase. The rise in voltage V3 reduces the base emitter bias of transistor Q3 causing current I1, in differential amplifier 100, to decrease. The decrease in differential amplifier current I1 results in a decrease in signal amplitude V1, thus a negative feedback control loop is formed which reduces SVM drive signal amplitude and prevents over dissipation in SVM coil driver amplifier 400. However, it will be appreciated that since the SVM signal amplitude is controlled by differential amplifier 100 in response to voltage V3, such a control signal may be derived responsive to a user sharpness control. Such manual control of SVM signal amplitude or peaking may be facilitated by an open control loop where a user determined control signal Vs is coupled to differential amplifier 100. Furthermore, user controlled sharpness may be facilitated in conjunction with the closed control loop thereby preventing over dissipation in output amplifier 400.

A processed SVM signal Y' is applied to a base electrode of an NPN transistor Q1 which with NPN transistor Q2 forms differential amplifier 100. SVM signal Y'gnd is applied to the base of transistor Q2 which has the collector electrode coupled to a power supply via a resistor R6. An output signal V1 is developed across resistor R6. The collector of transistor Q1 is connected directly the power supply and the emitter is coupled to the emitter of transistor Q2 via a pair of series connected resistors R1 and R2. The junction of the resistors is connected to the collector of an NPN transistor Q3. The base of transistor Q3 is connected to a potential of approximately 1.2 volts formed at the junction of divider resistors R3 and R4, where resistor R3 is connected to a 24 volt supply and resistor R4 is connected to ground. The emitter of transistor Q3 is connected to ground via resistor R5. Thus, if power control signal V3 is insufficient to turn on diode D1, current I1, and thus the SVM signal amplitude V1 at the collector of transistor Q2 is determined by the resistive divider R3 and R4.

The amplitude controlled SVM signal V1, is coupled to buffer amplifier 200, at the base of emitter follower transistor Q4. The collector of transistor Q4 is connected to the power supply and the emitter is connected to ground via resistor R7. The emitter of transistor Q4 is also connected to driver amplifier 300 at the bases of emitter follower connected transistors Q5 and Q6, NPN and PNP respectively. This emitter follower configuration may be considered to function as a push pull follower where transistor Q5 conducts on positive signal excursions and transistor Q6 conducts on negative signal excursions with the center part of the signal, approximately ±600 millivolts, removed or cored. The collector of transistor Q5 is connected to the power supply and the collector of transistor Q6 is connected to ground. The emitters of transistors Q5 and Q6 are connected via a resistor R8 which forms an output load resistor. Output signals from driver amplifier 300 are coupled to power amplifier 400 via capacitors C1 and C2 from the emitters of transistors Q5 and Q6 respectively. Capacitors C1 and C2 provide AC coupling of the SVM signal to power amplifier 400 at the respective bases of SVM coil driver transistors Q7 and Q8.

The SVM coil driver transistors Q7 and Q8 form a complementary amplifier where the base electrodes are biased for nominally class B operation by a resistive potential divider formed by resistors R9, R10, R11 and R12 and coupled between a high voltage supply and ground. Resistor R9 is connected between the high voltage supply and the base of transistor Q7, which also receives the AC coupled SVM signal from capacitor C1. The base of transistor Q7 is also connected to the base of transistor Q8 via series connected resistors R10 and R11. The junction of resistors R10 and R11 is decoupled to ground by capacitor C3 which is also connected to one end of SVM coil L3. Resistor R12 connects the base of transistor Q8 to ground to complete the biasing potential divider. The AC coupled SVM signal from capacitor C2 also connected to the base of transistor Q8.

The collectors of power amplifier transistors Q7 and Q8 are joined to form the SVM output signal which is coupled to SVM coil L3. A resistor R17 is connected across SVM deflection coil L3 to damp resonant effects of the coil, wiring and parasitic capacitance. The low signal end of SVM coil L3 and resistor R17 are connected to the junction of resistors R10, R11 and capacitor C3 which is biased to a potential of approximately half that of the high voltage supply. Power amplifier 400 may be considered as a bridge arrangement where the SVM coil is driven from transistor Q7 and Q8 collectors with the low side of the coil returned to the transistor emitters via low impedance AC coupled series networks, formed respectively by capacitor C4 and resistor R15 to transistor Q7 emitter and capacitor C5 and resistor R16 to the emitter of transistor Q8. Transistor Q7 emitter is supplied with current from the high voltage supply via resistor R13, and transistor Q8 emitter completes the output amplifier current path to ground via resistor R14. Thus in simple terms negative transitions in the SVM signal applied to the base of transistor Q7 base may be considered to cause conduction and charge capacitor C3 towards the supply potential, while positive transitions in the SVM signal applied to transistor Q8 cause capacitor C3 to be discharged towards ground.

A resistor R18 is connected to the junction of capacitor C5 and resistor R16 and couples a voltage V2 formed across resistor R14, in proportion to the current I2 flow in the driver amplifier. The other end of resistor R18 is connected to capacitor C8 which is connected to ground forming lowpass filter 500 and generating DC power limiter voltage V3. The DC power limiter voltage V3 is applied to the anode of diode D1 which conducts when voltage V3 exceeds the diode potential and the positive potential existing at the emitter of transistor Q3. Thus, when diode D1 conducts the base emitter bias of differential amplifier current source transistor Q3 is reduced. The reduction in base emitter bias of transistor Q3 causes current I1 to reduce, thereby reducing the amplitude of SVM signal V1. Similarly sharpness signal Vs may be applied via resistor R30 to low pass filter capacitor C6, and as described for power limiter voltage V3, cause current I1 to change, and so too the perceived picture sharpness by amplitude control of SVM signal V1. Thus, SVM signal amplitude may be controlled in proportion to the current I2 to limit dissipation, and overheating, in the power amplifier transistors Q7 and Q8, or in response to user determined sharpness requirement, or as a combination of both.

However, although the amplitude of SVM signal V1 may be controlled to limit power dissipation or control display sharpness, the amplitude V1 control mechanism of differential amplifier 100 also produces a corresponding change in the DC component of signal V1 as the amplitude is changed. For example, a reduction in current I1, reduces signal V1 amplitude, and in addition produces less voltage drop across resistor R6. Thus as the amplitude of signal V1 is reduced, the DC component of signal V1 moves closer to the power supply potential. Hence as the SVM amplitude is controlled, the succeeding DC coupled amplifier stages 200 and 300 are subjected varying DC bias conditions which may produce consequential changes in the linearity of the SVM signal or differences in gain with SVM signal polarity. When current I1 approaches nominally zero, the output voltage will nominally reach the supply voltage. This is a problem when the circuitry following the differential amplifier needs to be DC coupled. As the output DC increases, the circuitry following the differential amplifier can develop bias currents that are too high, too low, or non symmetrical. Currents that are too low or too high can cause devices to cutoff or saturate and currents that become non-symmetrical can cause differences in waveform shape, frequency response, impedance values.

To facilitate enhanced performance required for the display HDTV images requires that the bandwidth of the SVM system be increased, whilst maintaining or improving SVM signal symmetry. In addition, higher peak SVM current requirements conflict with a requirement to comply with TV receiver emissions standards. Furthermore, the implementation of electron beam velocity modulation in a projection display apparatus increases the number of SVM drive amplifiers and respective harnesses, thus increasing the likelihood for unintentional emissions. As described previously, an exemplary reduction in signal V1 amplitude causes a corresponding increase in the DC component of the signal. Thus control of SVM amplitude may result in changing bias currents causing nonlinear operation and consequential asymmetry between positive and negative transitions in the SVM signal. Such signal asymmetry or nonlinearity inherently generates harmonic products likely to be emitted or radiated both within and beyond the display. Furthermore, asymmetry of positive and negative SVM signal transitions give rise to dissimilar electron beam deflection which is manifest as nonsymmetrical edge enhancement. In addition, asymmetric SVM waveforms driving power amplifier 400 give rise to further generation of higher power, unwanted harmonic products capable of emission beyond the display device.

Figure 2:
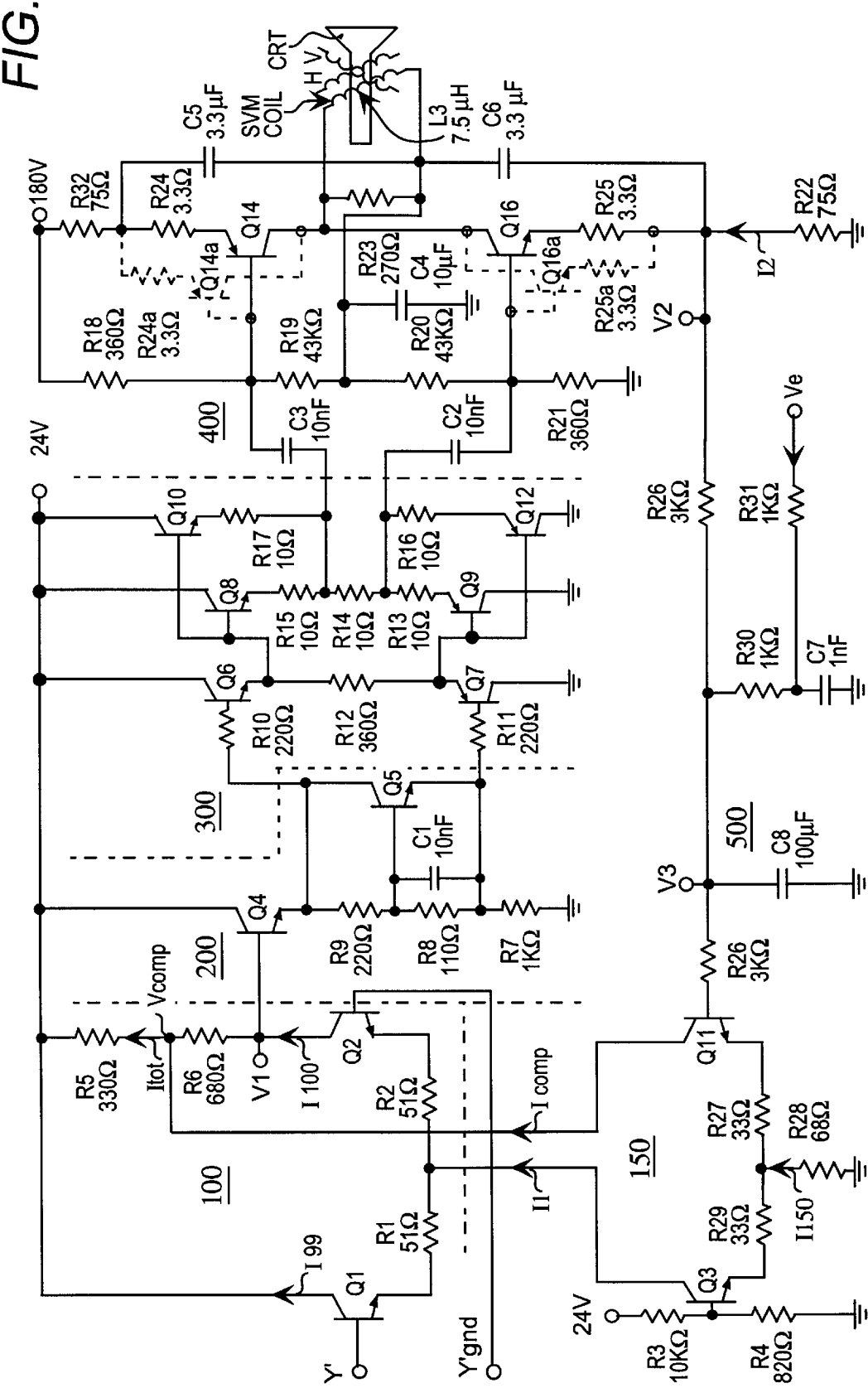
FIG. 2 illustrates a further exemplary SVM circuit arrangement including emission control of the SVM signal amplitude.

The problem of DC component variation as the SVM signal amplitude is controlled, is eliminated by an advantageous circuit arrangement shown in FIG. 2. In FIG. 2 a processed SVM signal Y' is applied to a base electrode of an NPN transistor Q1 which with NPN transistor Q2 forms differential amplifier 100. SVM signal Y' gnd is applied to the base of transistor Q2 which has the collector electrode coupled to a power supply via series connected resistors R5 and R6. An output signal V1 is developed across resistors R5 and R6. The collector of transistor Q1 is connected directly the power supply and the emitter is coupled to the emitter of transistor Q2 via a pair of series connected resistors R1 and R2. The junction of resistors R1 and R2 is connected to the collector of an NPN transistor Q3 which with transistor Q11 forms differential amplifier 150. The base of transistor Q3 is connected to a potential of approximately 4.1 volts formed at the junction of divider resistors R3 and R4, where resistor R3 is connected to a 24 volt supply and resistor R4 is connected to ground. The emitter of transistor Q3 is connected to the emitter of transistor Q11 via series connected resistors R27 and R29. The junction of resistors R27 and R29 is connected to ground via resistor R28. The collector of transistor Q11 is connected, via load resistor R5 of amplifier 100, to the supply voltage. The base of transistor Q11 is coupled to a gain control voltage V3 via a series connected resistor R26 and lowpass filter 500.

The operation of differential amplifiers 100 and 150 may be understood by means of an example where gain control voltage V3 is increased at transistor Q11 base and consequently current I150 is progressively diverted from transistor Q3 to transistor Q11. Thus, as the current in transistor Q3 is reduced, so too is collector current I1 which supplies differential amplifier 100 and controls output signal V1 amplitude. Advantageously, the diverted current Icomp from transistor Q11 collector is coupled to the junction of resistors R5 and R6 which form the output load of differential amplifier 100. Thus an exemplary positive increase in the value of control signal V3, results in both currents I1 and I100 decreasing, whilst current Icomp increases to produce a compensatory DC voltage such that SVM signal V1 is reduced in amplitude without any significant corresponding increase in the DC component of the signal.

In transistor Q3, current I1 is coupled to differential amplifier 100, and is divided between transistors Q1 and Q2. In amplifier 150, transistor Q11 current Icomp, which represents the difference between currents I150 and I1 , is coupled as described to the junction of load resistors R5 and R6. Thus current Ito150 flowing through resistor R5 to the supply is approximately Icomp +I100, however, Itot is less than I150 as a consequence of current I99 in transistor Q1. Thus, as the gain control current I1 in transistor Q3 is controllably reduced, a corresponding complementary current Icomp increases in transistor Q11. The value of load resistor R5 is selected such that when currents I100 and Icomp are combined as Itot, the voltage Vcomp developed across resistor R5 remains substantially constant regardless of the ratios of the currents resulting from SVM signal amplitude control. Thus, as the signal amplitude is reduced in amplifier 100, the compensating increased current flows through part of amplifier 100 load resistor with the result that the DC component remains substantially constant. In addition the differential amplifier AC characteristic are substantially unaffected as the gain of differential amplifier 100 is controlled. Thus, the advantageous maintenance of DC component largely eliminates changes in linearity and transient response occurring in subsequent SVM signal amplifying stages. In addition by eliminating linearity and transient response distortions, the SVM signal symmetry is maintained to yield substantially equal pre and post edge enhancement. Furthermore such signal waveform symmetry prevents dissimilar drive signals with attendant harmonic signal generation.

The amplitude controlled, DC stabilized signal V1 of FIG. 2, is coupled to buffer amplifier 200 which comprises an emitter follower transistor Q4 and transistor Q5 configured as an adjustable diode. Signal V1 is applied the base of emitter follower transistor Q4 with the emitter coupled to transistor Q5 base. The collector of transistor Q4 is connected directly to the power supply and the emitter is coupled, via three resistors R9, R8, R7, connected as a potential divider to ground. A capacitor C1 is connected across resistor R8. The emitter of transistor Q4 is connected to the collector of transistor Q5 and, via a series resistor R10 to the base of transistor Q6. The junction of resistors R9, R8 is connected to the base of transistor Q5 with the emitter connected to the junction of resistors R8, R7. The emitter of transistor Q5 is also via a series resistor R11 to the base of transistor Q7. The potential across resistor R8 is approximately one third of the potential across resistors R9, R8 and the collector and emitter of transistor Q5. However, the potential across resistor R8 is set by the base emitter voltage Vbe of transistor Q5, thus the collector to emitter voltage stabilizes at a value substantially three times that of base emitter voltage Vbe. Thus, transistor Q5 may be considered to represent an adjustable reference diode of about 2.1 volts or a Vbe voltage multiplier which establishes a collector to emitter voltage of about three times transistor Q5 Vbe potential. Hence the SVM signals coupled to the bases of respective push pull emitter follower transistors Q6, and Q7 of driver 300 are DC offset, one from the other by a potential of three times transistor Q5 Vbe. The SVM signal between the emitters of parallel connected emitter follower transistors Q8/10 and Q 9/12 has been subject to 4 Vbe offset potentials. However, since the signals at resistors R10 and R11 were biased to a value of 3Vbe, the signal at the emitters of transistors Q8/10 and Q 9/12 has been subjected to 1Vbe or approximately 700 millivolts of noise coring. Driver amplifier 300 comprises NPN emitter follower transistors Q6, Q8 and Q10 and PNP emitter follower transistors Q7, Q9 and Q12. The emitters of transistor Q6 and Q7 are coupled together by resistor R12, with the collector of transistor Q6 connected to the supply voltage and the collector of transistor Q7 connected to ground. The bases of parallel connected transistors Q8 and Q10 are connected to the emitter of transistor Q6, and the collectors are connected to the positive supply. The emitters of transistors Q8 and Q10 are each coupled via series resistors R15 and R17 to form an output signal for coupling to capacitor C3 of power amplifier stage 400. Similarly, the bases of parallel connected transistors Q7 and Q9 are connected to the emitter of transistor Q7. The collectors of transistors Q9 and Q12 are connected to ground with emitters of each transistor coupled via series resistors R13 and R16 respectively to form an output signal for coupling to capacitor C2 of power amplifier stage 400. The junction of output resistors R15 and R17 and capacitor C3 is connected to the corresponding components of transistors Q9 and Q12 via resistor R14.

Power amplifier 400 of FIG. 2 is shown coupled to a scanning velocity modulation deflection coil L3 which is positioned on a neck region of a cathode ray tube, CRT which also shows vertical and horizontal deflection coils marked V and H respectively. A resistor R23 is connected in parallel with SVM coil L3 to damp any resonance effects and provide a flatter frequency response. The SVM coil L3 functions in conjunction with horizontal deflection coil to perturb scanning velocity in the direction of the horizontal scan.

The SVM drive signal is AC coupled by capacitor C3 between the junction of resistors R14, R15 and R17 and the base of power amplifier transistor Q14. Similarly capacitor C2 provides AC coupling between the junction of resistors R13, R14 and R16 and the base of power amplifier transistor Q16. A potential divider, formed by resistors R18, R19 R20 and R21 is connected between a high voltage supply, for example 180 volts and ground potential. The divider generates voltages of approximately 0.7 volts above ground and approximately 0.7 volts below the high voltage supply to bias the bases of output transistors Q16 and Q14 respectively. At the junction of divider resistors R19 and R20 a voltage is generated substantially equal to half the value of high voltage supply. This DC potential is coupled to capacitor C4 and may be considered the source SVM coil current where negative SVM signal transients, coupled via capacitor C3 cause transistor Q14 to turn on and attempt to charge capacitor C4 to the value of the high voltage supply. Similarly, positive SVM signal transients, coupled via capacitor C2, cause transistor Q16 to turn on and attempt to discharge capacitor C4 to ground. However, these SVM signal related currents are coupled via SVM deflection coil L3 to the respective emitters of transistors Q14 and Q16, via low impedance series connected resistor and capacitor networks R24, C5 and R25, C6 respectively, to produce the required velocity perturbations of the scanning electron beam. The average current conducted by power transistors Q14 and Q16 flows to ground via resistor R22 generating voltage V2 in proportion to the current magnitude. Voltage V2 is coupled to low pass filter 500 formed by series connected resistor R26 and shunt connected capacitor C8, which generates voltage V3. The low pass filtered voltage V3 is coupled via series connected resistor R26 to the base of transistor Q11 which forms part of differential amplifier 150. As described previously, an exemplary increase in voltage V3 causes current I150 to be progressively diverted from transistor Q3 which reduces collector current I1 and decreases the amplitude of SVM signal V1 at the collector of transistor Q2.

In an alternative output arrangement, power amplifier stage 400, transistors Q14 and Q16 may be replaced with transistor pairs, connected in parallel in a similar manner to transistor pair Q8,10 and transistor pair Q9,12. This alternative, paralleled output power transistor configuration is depicted in FIG. 2 by components Q14a, Q16a, R24a and R25a, all shown by dotted lines.

As has been described previously, SVM signal processing deficiencies may generate unwanted products and harmonics which may be conducted or radiated both within and beyond the display device. Furthermore, generation and unintentional radiation by the display device is mandated by the Federal Communications Commission, 47 CFR§ 15 subpart B, Unintentional Radiators, section §15.101, which specifies limits for emission spectra between 30 MHz and 1 GHz. Thus, although careful attention to circuit design and layout can significantly reduce the generation of unwanted SVM products or harmonics, unwanted radiation can result as a consequence of the high frequency pulsed current providing the velocity modulating deflection field. The SVM coil current is of the order of 1 ampere with both pulse duration and repetition periods of approximately 100 nano second, thus the SVM coil current is particularly rich in harmonic products which exhibit a propensity to radiate from both the coupling and the SVM coil. The actual display signal may contain images of sufficient and magnitude and spectral content which exacerbate the likelihood of radiation and unintentional emission. For example, a page of static text, of approximately 200 characters wide and displaying the letter H, has been found to generate an SVM signal of high amplitude and extreme spectral content sufficient to cause unintentional emissions. Similarly video display images containing high amplitude brightness alternations will produce similar problematic SVM signals particularly if the image is subjected to size variation, for example by zooming which may be considered to yield a swept frequency spectra.

Figure 3A:
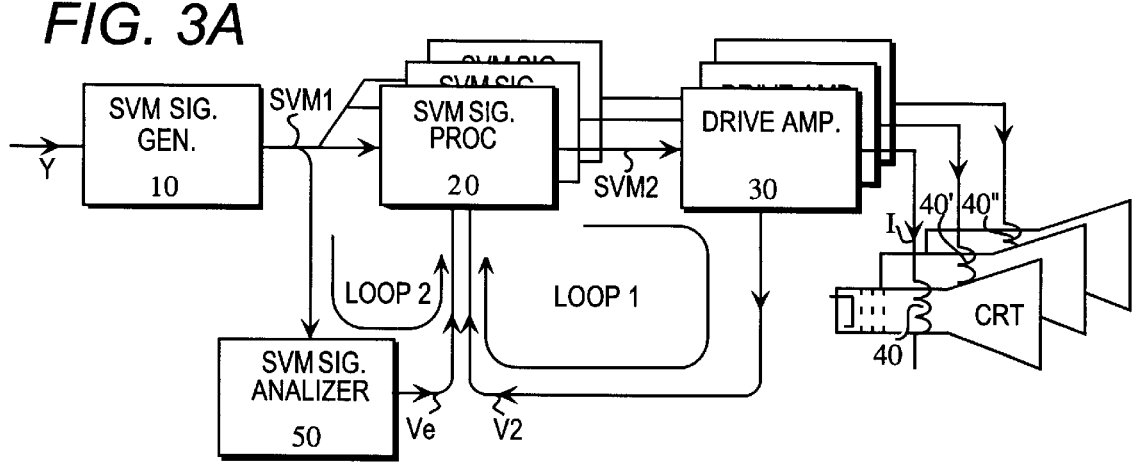
FIG. 3A is a block diagram of an inventive arrangement for SVM emission control.

An advantageous SVM emission control arrangement is illustrated in FIG. 3A which shows an inventive arrangement in a projection display apparatus with three display tubes each with an SVM coil, (40, 40', 40") and driver amplifier. Although three cathode ray tubes are depicted, the problem of SVM emission and the inventive solution thereto is equally applicable to a display device with a single CRT. This exemplary control arrangement employs a negative feedback control loop, LOOP 1, for control of SVM driver power dissipation and a feed forward open control loop, LOOP 2, for control of SVM derived emissions. In FIG. 3A each SVM coil driver amplifier, for example DRIVE AMP 30, generates a control signal V2 in accordance with output power dissipation which is fed back to each respective SVM signal processor. However, for the sake of drawing clarity each individual control loop is not shown.

Operation of the SVM emission control arrangement of FIG. 3A is as follows. A luminance signal component Y derived from the display signal is coupled to block 10 which processes luminance component Y to form an output signal SVM1 by use of well known methods, for example by differentiation, or band shaping filters. Signal SVM 1, from block 10, is coupled to block 20 which additionally processes the signal, for example to provide SVM signal clipping, noise coring and amplitude control, as has been described with reference to the circuit illustrated in FIG. 2. The amplitude controlled signal, SVM 2, is coupled to coil driver power amplifier stage 30 which generates current pulses I for coupling to SVM deflection coil 40 to produce the desired velocity modulation of the scanning beam. The average current flow in exemplary coil driver amplifier 30 is monitored and fed back to block 20 to form a negative feedback loop for control of SVM signal amplitude in response to power dissipation in the SVM coil driver amplifier. However, because the closed loop controls average driver dissipation it is ineffective in responding to SVM signal components likely to result in unwanted emissions. Unwanted emissions typically result from rapid edge transitions in the display image signal, which as a consequence, contain harmonically related spectral products of significant amplitude. Hence SVM signal analyzer block 50 advantageously analyzes the spectral content of signal SVM1 and generates an open loop control signal Ve responsive to the amplitude and spectral composition. Emission control signal Ve is applied as an open loop, feed forward control signal, forming control loop LOOP2 to provide open loop amplitude control of the SVM signal driving coil 40.

Figure 3B:
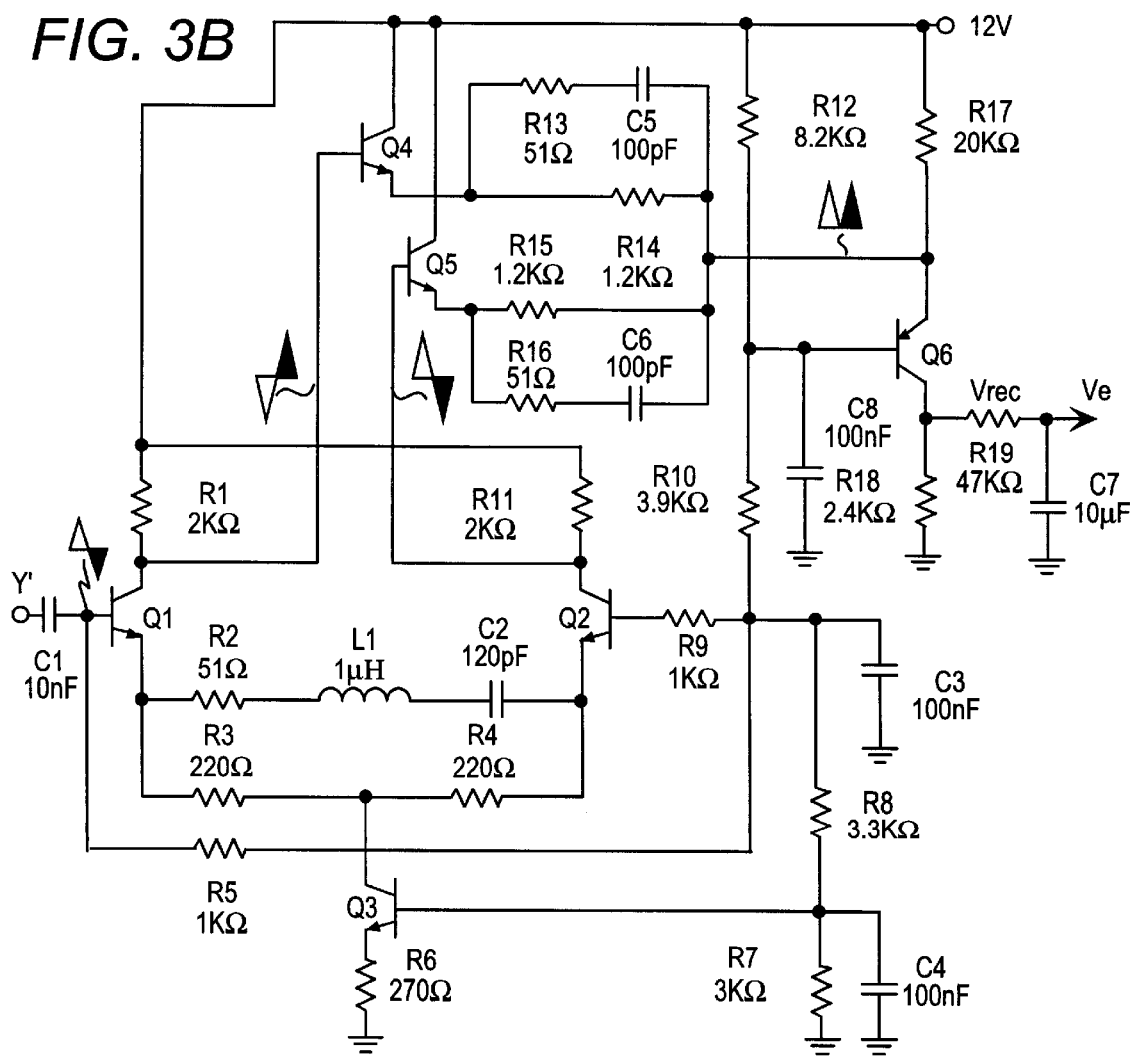
FIG. 3B illustrates an inventive arrangement for generating an SVM emission control signal.

FIG. 3B shows an inventive arrangement which analyzes the amplitude and spectral content of the processed display signal Y' input to the SVM amplitude controller of exemplary FIG. 2. The arrangement of FIG. 3B generates a DC signal Ve which is provides open loop control of SVM signal amplitude applied in addition to the closed loop power control provided by signal V2. In FIG. 3B the processed display signal Y' is coupled via a capacitor C1 to the base of NPN transistor Q1, which with NPN transistor Q2 are configured as a differential amplifier. The base of transistor Q1 is also coupled via series connected resistors R5 and R9 to the base of transistor Q2. The junction of resistors R5 and R9 is connected to a potential divider which provides biasing potentials of approximately 4 volts for the bases of transistors Q1 and Q2, approximately 2 volts for the base of current source transistor Q3 and approximately 6.5 volts for the base of output transistor Q6. The potential divider is formed by resistors R7, R11, R10 and R12, with resistor R12 connected to a positive supply, for example 12 volts, and resistor R7 connected to ground. The junction of resistors R12 and R10 is decoupled to ground by capacitor C8, with junction of resistors R10 and R11 decoupled to ground by capacitor C3 and resistors R11 and R7 decoupled to ground by capacitor C4. The emitter of current source transistor Q3 is connected to ground via resistor R6 with the collector supplying current to the junction of gain determining resistors R3 and R4 which are coupled in series between the emitters of transistors Q1 and Q2. A frequency selective network is formed by inductor L1 capacitor C2 and damping resistor R2, connected as a series tuned circuit or filter, coupled in parallel with gain determining resistors R3 and R4 of the differential amplifier. Thus the gain of the differential amplifier is progressively increased from a value determined by resistors R3 and R4, to a maximum value approximately nine times greater as the series tuned circuit, or bandpass filter, formed by inductor L1 and capacitor C2 approaches series resonance at approximately 15 MHz. The collectors of differential amplifier transistors Q1 and Q2 are connected to the positive supply by load resistors R1 and R11 across which a frequency dependent output signal is formed. Thus input signal Y' is selectively amplified with signal frequency components occurring within the bandwidth of the bandpass filter receiving greater amplification than frequency components falling outside the filter bandwidth.

The selectively amplified components appear in antiphase at the collectors of transistors Q1 and Q2 and are coupled to bases of respective NPN emitter followers Q4 and Q5. The collectors of transistors Q4 and Q5 are connected to the power supply and the emitters are each coupled to the emitter of current source transistor Q6 via frequency selective networks Thus transistors Q4 and Q5 may be considered to function as a full wave rectifier supplying positive signal currents to the emitter of transistor Q6. The frequency selective network of transistor Q4 comprises a series resistor R14, coupled in parallel with a resistor R13 and a capacitor C5 connected in series. A similar network in the emitter of transistor Q5 comprises series resistor R15, coupled in parallel with a resistor R16 and a capacitor C6. The series connected resistor and capacitor allow higher frequency signal components to bypass emitter load resistors R14 and R15 respectively. The emitter of transistor Q6 is coupled to the positive supply via resistor R17 with the collector connected to ground by resistor R18. The base of current source transistor Q6 is biased at about 6.5 volts from the junction of resistors R12 and R10 which results in emitter followers Q4 and Q5, coupled to the emitter of transistor Q6, conducting only on positive signal components having sufficient amplitude to overcome the emitter potential of transistor Q6. Hence by combining frequency selectivity and processed signal amplitude, only display signals of specific magnitude and spectral composition will cause the generation of the emission control signal Ve. The arrangement of transistors Q4, Q5 and Q6 may be considered to function as a fullwave rectifier charging capacitor C7 positively via resistor R19 to form emission control signal Ve. However, not only is capacitor C7 charged by both polarities of input signal Y', but control signal Ve is also responsive to the spectral composition of the signal Y'. In simple terms, the greater the number of transitions derived from display image detail, the greater will be the voltage generated across capacitor C7. In addition, Y' signal frequency components in a range about 15 MHz receive greater amplification. Thus emission control signal Ve is responsive to both positive and negative signal transitions, the rate of transition occurrence and is weighted towards control signal Ve generation for SVM components occurring in the range about 15 MHz. Emission control signal Ve is coupled to a low pass filter formed by resistors R31 and R30 connected in series with the junction decoupled to ground by capacitor C7 in the exemplary SVM amplitude control arrangement shown in FIG. 2. Amplitude control signal V3, is shown in both FIGS. 2 and 4, has a value of approximately 1.2 volts at the onset of output power control. However, when images such as the exemplary H text field is displayed, the value of amplitude control signal V3 rises to approximately 2.4 volts which reduces the SVM drive signal amplitude substantially to zero.

Figure 4:
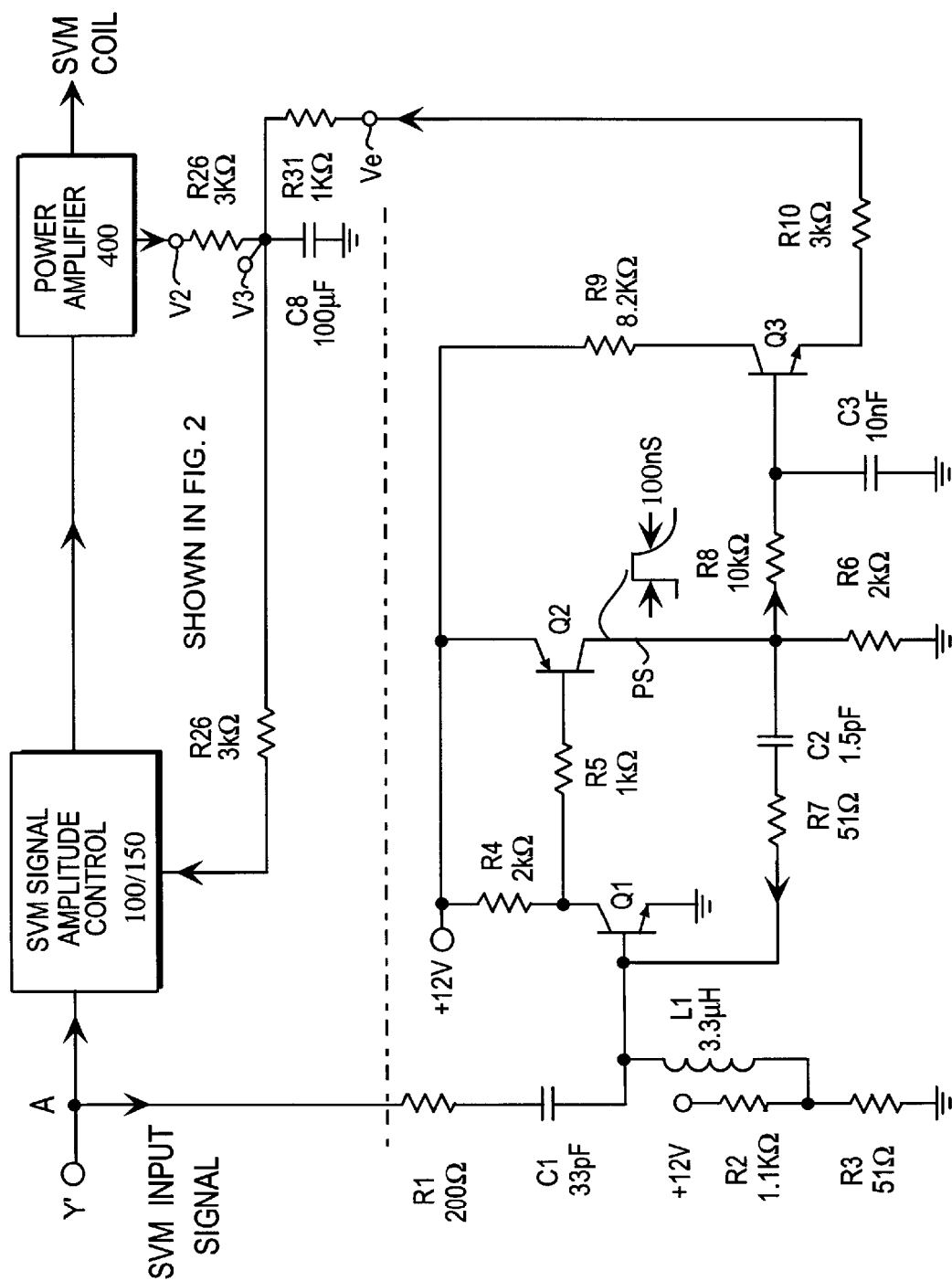
FIG. 4 illustrates an further inventive arrangement for generating an SVM emission control signal.

FIG. 4 shows a further inventive arrangement for regeneratively generating an emission control signal Ve. The processed display signal Y' is coupled via a series resistor R1 and a capacitor C1 to the base of an NPN transistor Q1. The base of transistor Q1 is also connected to an inductor L1 which supplies a bias potential of approximately 0.5 volts from voltage divider formed by resistors R2 and R3. Resistor R2 is connected to a positive supply, for example 12 volts, with resistor R3 connected to ground. The collector of transistor Q1 is connected to the positive supply by a resistor R4 and the emitter is connected to ground. Capacitor C1 and inductor L1 form a series resonant filter with a frequency of approximately 15 MHz. Thus components of input signal Y' with frequencies in the range about 15 MHz are increased in amplitude by the resonant action of the series resonant circuit. Since the base of transistor Q1 is biased at approximately 0.5 volts, only positive SVM signal components with amplitudes in excess of a few hundred millivolts are sufficient to turn on the transistor. The collector of transistor Q1 is coupled via resistor R5 to the base of a PNP transistor Q2 which has the emitter connected to the positive supply and the collector connected to ground via load resistor R6. The collector transistor Q2 is also fed back to the base of transistor Q1 via a differentiating network formed by capacitor C2 and resistor R7 which provide positive feedback creating a monostable action. Thus positive Y' signal components of sufficient amplitude and or frequency range cause transistors Q1 and Q2 to assume an unstable condition for a time period of approximately 100 nano seconds, determined by capacitor C2. The conduction of transistor Q2 generates a positive, nominally 12 volt pulse PS at the collector which is coupled to a resistor R8 and capacitor C3 connected in series to ground to form an integrator. The junction of the capacitor and resistor is joined to the base of an emitter follower transistor Q3 which generates an output control signal Ve. The collector of transistor Q3 is connected to the positive supply by a resistor R9 and the emitter is coupled via resistors R10 R31 to low pass filter 500 of exemplary SVM amplitude controller, shown in FIG. 2.

Figure 5:
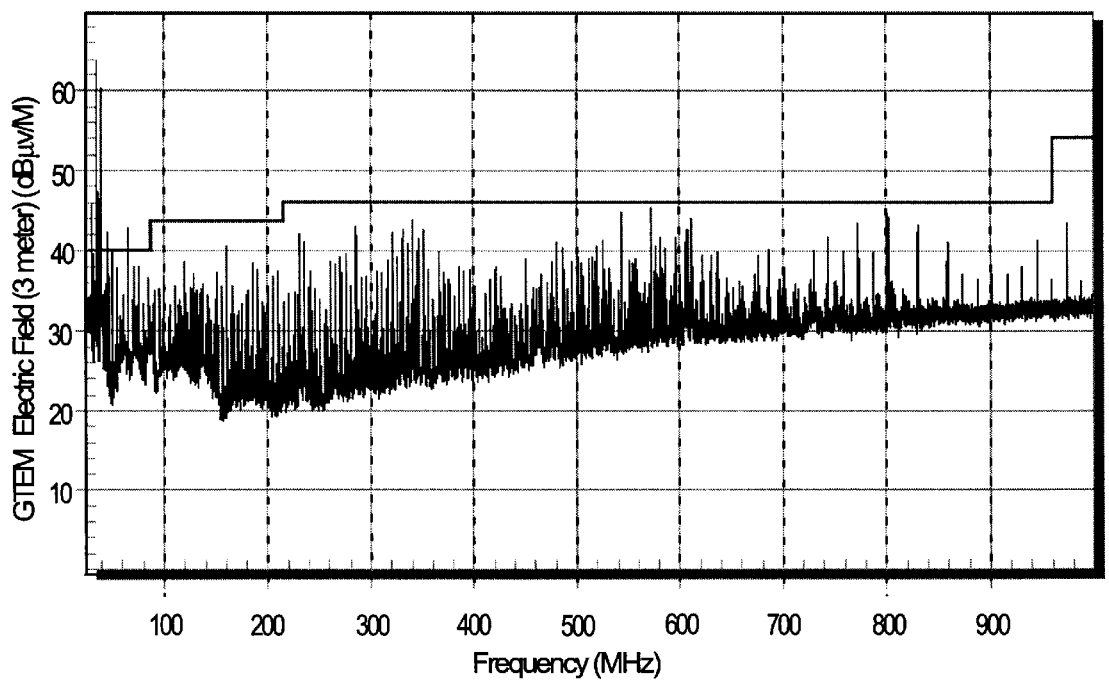
FIGS. 5 and 6 are frequency spectrum plots showing measured emission performance against an FCC part 15b standard graticule for levels of unintentional radiation.
Figure 6:
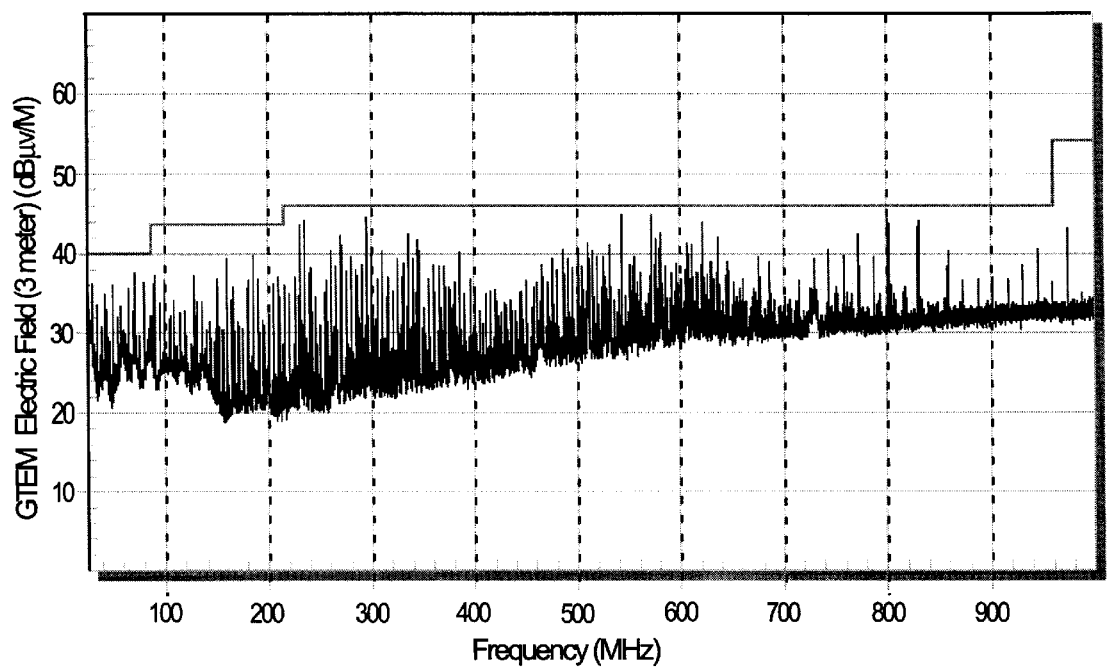

FIG. 5 depicts the summed electromagnetic radiation emanating from three axes of the display at a distance of 3 meters, measured from 30 MHz to 1 GHz in accordance with FCC Part 15b mandated performance measurement graticule. The emission spectra shown in FIG. 5 is representative of emissions resulting from the display of the text field comprising the letter H without use of applicant's inventive control arrangement. FIG. 5 indicates that spectral components exceeding the performance limit graticule exist in a frequency band extending from nominally 30 MHz to approximately 100 MHz. The use of applicant's inventive arrangement of FIG. 3B, is applied to the amplitude control circuitry of FIG. 2 and provides open loop control of SVM amplitude. Applicant's inventive control signal derivation results in unwanted emissions which are significantly reduced below the mandated levels and compliance with the requirements of FCC Part 15b is achieved as shown in FIG. 6.

What is claimed is:

1. An apparatus for scanning beam velocity modulation, comprising:
    an scanning velocity modulation signal processor for generating an scanning velocity modulation deflection signal responsive to a scanning velocity modulation signal;
    means for supplying a feed forward signal to said processor for controlling said scanning velocity modulation deflection signal amplitude responsive to a component of said scanning velocity modulation signal.

2. The apparatus of claim 1, further comprising a driver amplifier for generating an amplified deflection signal responsive to said scanning velocity modulation deflection signal and a feed back control signal representative of dissipation in said driver amplifier coupled to provide negative feedback control of said amplitude of said scanning velocity modulation deflection signal.

3. The apparatus of claim 1, wherein said means for supplying further comprises a filter for generating said feed forward signal responsive to frequency components of said scanning velocity modulation signal occurring within a bandwidth of said filter.

4. The apparatus of claim 3, wherein an increase in said feed forward signal controllably reduces said amplitude of said scanning velocity modulation deflection signal to reduce emission therefrom.

5. The apparatus of claim 3, wherein said filter further comprises an amplifier for amplifying said frequency components occurring within said filter bandwidth.

6. The apparatus of claim 5, wherein said amplifier further comprises a detector for generating said feed forward signal having an amplitude value responsive to amplitudes of said frequency components.

7. The apparatus of claim 6, wherein said detector is a full wave rectifier.

8. The apparatus of claim 5, wherein said amplifier further comprises a detector for generating said feed forward signal having an amplitude value responsive to the number of said frequency components.

9. The apparatus of claim 7, wherein said detector counts occurrences of said frequency components.

10. An apparatus for scanning beam velocity modulation comprising;
    a coil for modulating a velocity of a scanning electron beam;
    a power amplifier receiving a drive signal for driving said coil and modulating said velocity responsive to an amplitude of said drive signal;
    a source of a signal representative of a display signal edge;
    an amplifier receiving said representative signal and generating said drive signal having a controllable amplitude; and,
    a signal processor receiving said representative signal for filtering to generate a control signal responsive to a frequency component occurring within a bandwidth of a filter in said signal processor for coupling to said amplifier to control said amplitude of said drive signal responsive to said frequency component within said bandwidth.

11. The apparatus claim 10, wherein said control signal is generated responsive to an amplitude of said frequency component.

12. The apparatus claim 10, wherein said control signal is generated responsive to positive and negative signal parts of said representative signal.

13. The apparatus claim 10, wherein said amplifier generating said drive signal with a controllable amplitude is controlled by a second signal generated in accordance with power dissipated in said power amplifier.

14. An arrangement for emission control in a scanning beam velocity modulation apparatus comprising:
    a source of a signal processed for scanning beam velocity modulation in a CRT;
    an SVM amplitude controller receiving said processed signal and generating an amplitude controlled SVM signal having said amplitude controlled responsive to an amplitude control signal;
    an SVM coil driver amplifier coupled to receive said amplitude controlled SVM signal for causing scanning beam velocity modulation responsive thereto, and generating a first control signal representative of power dissipation in said driver amplifier; and,
    an SVM signal analyzer receiving said processed signal for generating a second control signal representative of frequency components of said processed signal,
        wherein said first control signal and said second control signal are coupled as said amplitude control signal to said SVM amplitude controller to control said processed signal amplitude responsive to driver amplifier power dissipation and frequency components of said processed SVM signal.

15. The emission control arrangement of claim 14, wherein said first control signal is coupled to said SVM amplitude controller to form a negative feed back control loop.

16. The emission control arrangement of claim 14, wherein said second control signal is coupled to said SVM amplitude controller to form a feed forward control loop.

* * * * *